US012806547B2

(12) United States Patent
Mustakangas et al.

(10) Patent No.: US 12,806,547 B2
(45) Date of Patent: *Nov. 24, 2026

(54) FILTER PLATE FRAME ASSEMBLY AND A HORIZONTAL FILTER PRESS, SUCH AS A TOWER PRESS, HAVING SUCH A PLATE FRAME ASSEMBLY

(71) Applicant: METSO FINLAND OY, Espoo (FI)

(72) Inventors: Mirva Mustakangas, Pirkkala (FI); Ismo Juvonen, Rauha (FI); Janne Kaipainen, Halsua (FI); Teemu Eloranta, Luumäki (FI); Mika Illi, Vantaa (FI); Kari Vänttinen, Espoo (FI)

(73) Assignee: Metso Finland Oy, Espoo (FI)

( * ) Notice: Subject to any disclaimer, the term of this patent is extended or adjusted under 35 U.S.C. 154(b) by 311 days.

This patent is subject to a terminal disclaimer.

(21) Appl. No.: 17/793,548

(22) PCT Filed: Apr. 17, 2020

(86) PCT No.: PCT/FI2020/050251

§ 371 (c)(1),
(2) Date: Jul. 18, 2022

(87) PCT Pub. No.: WO2021/209676

PCT Pub. Date: Oct. 21, 2021

(65) Prior Publication Data

US 2023/0048289 A1 Feb. 16, 2023

(51) Int. Cl.
*B01D 25/164* (2006.01)
*B01D 25/21* (2006.01)

(52) U.S. Cl.
CPC ......... *B01D 25/164* (2013.01); *B01D 25/215* (2013.01)

(58) Field of Classification Search
CPC ..... B01D 25/164; B01D 25/285; B01D 35/14
See application file for complete search history.

(56) References Cited

U.S. PATENT DOCUMENTS 4,617,863 A 10/1986 Kenyon
4,666,596 A * 5/1987 Oelbermann ........ B01D 25/215 210/231

(Continued)

FOREIGN PATENT DOCUMENTS

CN 103889536 A 8/2015
CN 204522419 U 8/2015

(Continued)

OTHER PUBLICATIONS

Office Action for Chinese Patent Application No. 202110417630.9, dated Aug. 12, 2022.

(Continued)

*Primary Examiner* — Bradley R Spies
*Assistant Examiner* — Jeannie Mcdermott
(74) *Attorney, Agent, or Firm* — Andrus Intellectual Property Law, LLP

(57) ABSTRACT

A filter plate frame assembly and a horizontal filter press, in which accidental over pressurization of the filter diaphragm is prevented. A filter plate frame assembly having a separate subframe is provided with a limited vertical travel with respect to the filter frame and the filter plate, such that the subframe is allowed to drop away from the filter plate when the filter chamber is opened. This enables a diaphragm to be attached to the subframe such that an escape route is formed for a pressurized medium accidentally introduced between the filter plate and the diaphragm. Moreover, the limited travel of the subframe allows the subframe to be pressed towards the filter plate when the filter chamber is closed, thereby allowing normal operation of the diaphragm for squeezing a filter cake.

6 Claims, 2 Drawing Sheets

(56) References Cited

U.S. PATENT DOCUMENTS

| | | | | | |
|---|---|---|---|---|---|
| 4,749,482 | A * | 6/1988 | Bonn | B01D 25/164 210/231 |
| 4,816,147 | A * | 3/1989 | Eyben | B01D 25/287 210/231 |
| 5,602,827 | A * | 2/1997 | Lindeborg | H04L 12/437 370/223 |
| 5,603,827 | A * | 2/1997 | Hermann | B01D 25/215 210/231 |
| 6,180,002 | B1 | 1/2001 | Higgins | |
| 2010/0163476 | A1 | 7/2010 | Bonn | |

FOREIGN PATENT DOCUMENTS

| | | | | |
|---|---|---|---|---|
| CN | 105561644 | A | 11/2017 | |
| CN | 110523116 | A | 12/2019 | |
| CN | 216149101 | U | 4/2022 | |
| DE | 19905674 | C1 | 3/2000 | |
| EP | 3473319 | A1 | 4/2019 | |
| WO | WO-2010127776 | A1 * | 11/2010 | B01D 25/285 |
| WO | WO-2016097839 | A1 * | 6/2016 | B01D 25/164 |

OTHER PUBLICATIONS

International Search Report and Written Opinion for PCT/FI2020/050251, mailed Jul. 8, 2020.
First Examination Report for Indian Application No. 202217042980, mailed Oct. 8, 2026.

* cited by examiner

FILTER PLATE FRAME ASSEMBLY AND A HORIZONTAL FILTER PRESS, SUCH AS A TOWER PRESS, HAVING SUCH A PLATE FRAME ASSEMBLY

CROSS REFERENCE TO RELATED APPLICATIONS

This application is the U.S. national stage application of International Application PCT/FI2020/050256, filed Apr. 17, 2020, which international application was published on Oct. 21, 2021, as International Publication WO 2021/209681 A1 in the English language.

FIELD OF THE DISCLOSURE

The present disclosure relates to horizontal filter presses, such as tower presses, and more particularly to a filter plate frame assembly for such a filter press.

BACKGROUND OF THE DISCLOSURE

In horizontal filter presses, a horizontally extending filter chamber is formed between adjacent, superimposed filter plate frame assemblies. During the filtration cycle, the filter plate assemblies are pressed against each other to seal the filter chamber, and a slurry is introduced into the filter chamber, where filtrate is separated from the slurry by a filter medium. The filtrate is conducted to further processing, while the solids content of the slurry form a filter cake in the filter chamber. The filter cake is removed from the filter chamber by lifting the filter plate frame assemblies such that they move away from each other (i.e., opening the filter chamber). The filter medium, typically forming an endless loop in a zig-zag-pattern, is advanced and the filter cake is discharged by dropping it from on top of the filter medium that turns around a roller.

In order to remove as much as possible of the liquid content of the filter cake, a diaphragm is often provided for squeezing the filter cake in the filter chamber, so as to extract residual filtrate from the filter cake. Such a diaphragm is typically attached to a filter frame such that it resides vertically between the frame and a filter plate supported by the frame. A space between the diaphragm and the filter plate is sealed with a seal bead on the diaphragm, such that a pressurized medium can be introduced into the space. The pressurized medium inflates the diaphragm towards the filter chamber thereby squeezing the filter cake. The pressure used to inflate the diaphragm typically lies between the range of 8-20 bar over the ambient pressure. The diaphragm can withstand this pressure because the pressure prevailing in the filter chamber (and the filter cake) prevents excessive deformation of the diaphragm, which would lead to damage.

It has been found out that in exceptionally rare cases of malfunction or improper use of the filter press, pressurized medium may be led into the space between the filter plate and the diaphragm when the filter chamber is opened. As no counteracting pressure is in the filter chamber, this allows the diaphragm to be excessively inflated, causing damage to, or even catastrophic failure of the diaphragm. This poses a serious risk of injury as it could lead to the diaphragm exploding.

BRIEF DESCRIPTION OF THE DISCLOSURE

An object of the present disclosure is to provide a filter plate frame assembly and a horizontal filter press, in which accidental overpressurization of the filter diaphragm is prevented.

The object of the disclosure is achieved by a filter plate frame assembly and a horizontal filter press which are characterized by what is stated in the independent claims. The preferred embodiments of the disclosure are disclosed in the dependent claims.

The disclosure is based on the idea of providing a filter plate frame assembly having a separate subframe with a limited vertical travel with respect to the filter frame and filter plate such that the subframe is allowed to drop away from the filter plate when the filter chamber is opened.

This enables a diaphragm to be attached to the subframe such that an escape route is formed for a pressurized medium accidentally introduced between the filter plate and the diaphragm. Moreover, the limited travel of the subframe allows the subframe to be pressed towards the filter plate when the filter chamber is closed, thereby allowing normal operation of the diaphragm for squeezing a filter cake formed in the filter chamber.

An advantage of the disclosure is that operational safety is significantly increased, as accidental introduction of a pressurized medium into a space between a diaphragm and a filter plate does not cause the diaphragm to excessively inflate

BRIEF DESCRIPTION OF THE DRAWINGS

In the following the disclosure will be described in greater detail by means of preferred embodiments with reference to the accompanying drawings, in which FIG. 1 schematically illustrates a filter plate frame assembly according to an embodiment of the present disclosure where the subframe is in a lowermost position, as seen as a partial cut-view.

DETAILED DESCRIPTION OF THE DISCLOSURE

Figure 1:
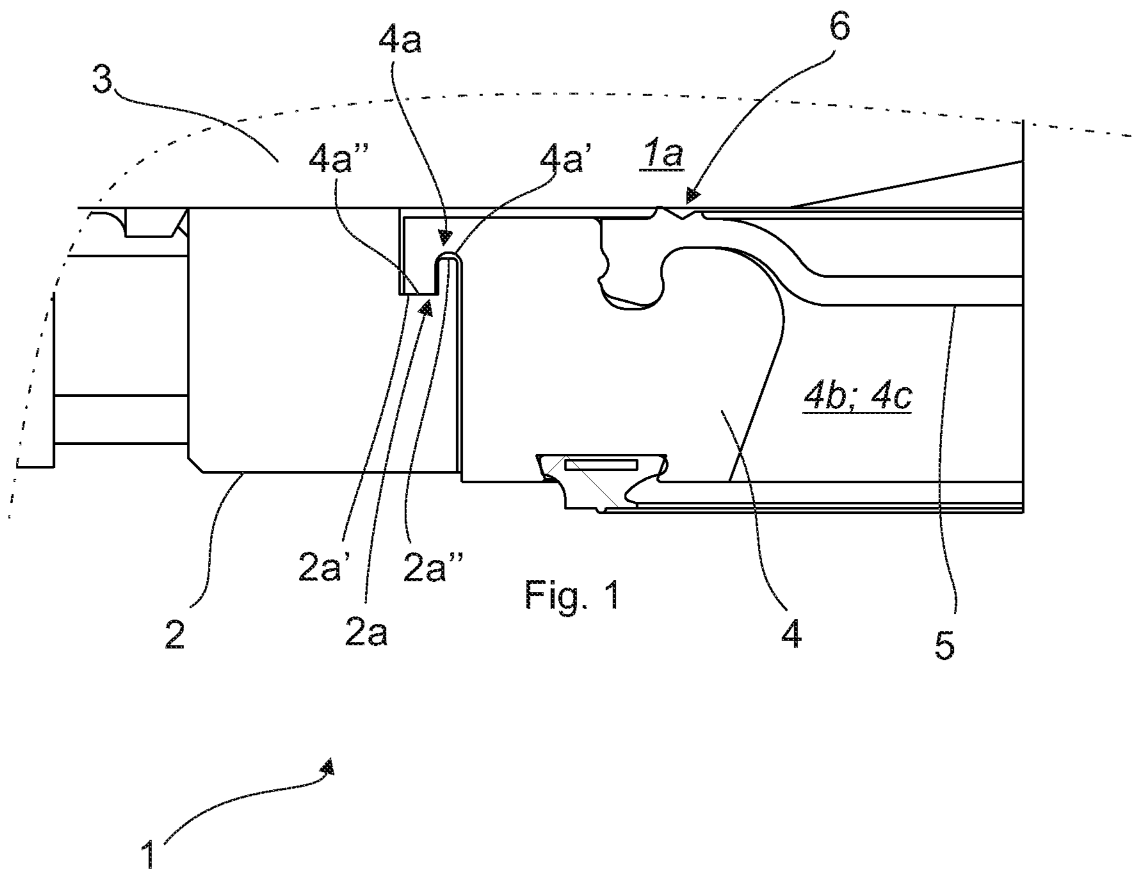
FIG. 1*a* illustrates a detailed view of the subframe, diaphragm and filter plate of FIG. 1

According to a first aspect of the present disclosure, a filter plate frame assembly 1 for a horizontal filter press, such as a tower press, is provided.

The filter plate frame assembly 1 comprises a rigid filter plate frame 2 defining a closed periphery. The purpose of the frame 2 is to support against laterally (i.e. horizontally) directed forces caused by the pressure prevailing in the filter chamber during operation, and also, provide a structure which can be lifted and lowered for opening and closing a filter chamber formed by adjacent filter plate frame assemblies 1.

The filter plate frame assembly 1 further comprises a filter plate 3 attached onto the filter plate frame 2 on a plate side 1*a* of the filter plate frame assembly 1, and covering at least an area delimited by the filter plate frame. The purpose of the filter plate is to provide support against vertically directed forces caused by the pressure prevailing in the filter chamber during operation, and also, to provide a structure onto which a filtrate vat for collecting filtrate can be formed.

The filter plate frame assembly 1 further comprises a diaphragm 5 having a continuous seal bead 6 for sealing the diaphragm 5 against the filter plate 3, such that a space delimited by the seal bead 6 is defined between the diaphragm 5 and the plate 3. As discussed earlier, the purpose of the diaphragm is to squeeze residual liquid contents out from the filter cake formed in the filter chamber. Suitably, the seal bead 6 extends around the periphery of diaphragm 5.

Particularly, the filter plate frame assembly 1 further comprises a subframe 4 with a central opening 4*b* having a closed area defining a lateral boundary of an associated filter chamber 4*c*, when in use. The subframe 4 is nested within and laterally delimited by the closed periphery of the filter plate frame 2. This means that the more rigid frame 2 supports the subframe 4 against lateral forces exerted thereon by a pressure prevailing in the filter chamber. Consequently, the subframe can be constructed with a much more light-weight and less rigid structure, as compare to the frame 2.

The subframe 4 is vertically secured between the filter plate frame 2 and the filter plate 3, such that a vertical free play of the subframe 4 between the plate 3 and the frame 2 allows a limited vertical travel of the subframe 4 with respect to the frame 2 and the plate 3. It should be noted that, in the context of this disclosure, the free play and the limited vertical travel are distinguished from, and exceed, any possible manufacturing clearances.

The diaphragm 5 is attached to the subframe 4 such that it resides between the subframe 4 and the filter plate 3 and covers an area delimited by the sub-frame 4. Most suitably, the diaphragm 4 resides vertically between the subframe 4 and the filter plate, at least at where the diaphragm 5 is to be sealed against the plate 3.

As the diaphragm is attached to the subframe 4, it shares the same limited vertical travel with respect to the filter plate 3 as the subframe.

In an embodiment according to the first aspect, the subframe 4 has an uppermost position within the limited vertical travel. The uppermost position corresponds to a situation in which the subframe 4 is pressed towards the plate 3, i.e., when adjacent filter plate frame assemblies 1 are pressed against each other so as to close a filter chamber formed therebetween. Correspondingly, the subframe 4 also has a lowermost position within the limited vertical travel. The lowermost position corresponds to a situation in which the subframe 4 is not pressed towards the plate 3, i.e., when adjacent filter plate frame assemblies 1 are away from each other so as to open a filter chamber formed therebetween Preferably, but not necessarily, the frame 2 comprises a first bearing surface 2*a* and the subframe 4 comprises a second bearing surface 4*a*. In the lowermost position, the subframe 4 is vertically supported by the first bearing surface 2*a* at the second bearing surface 4*a*. Moreover, in the uppermost position, the subframe 4 is not vertically supported by the by the first bearing surface 2*a*.

More preferably, but not necessarily, the first bearing surface 2*a* comprises a groove 2*a*' and a ridge 2*a*" and the second bearing surface 4*a* comprises a groove 4*a*' and ridge 4*a*". Particularly, the groove of the first bearing surface 2*a*' is configured to form fittingly receive the ridge 4*a*" of the second bearing surface 4*a*. Correspondingly, the groove 4*a*' of the second bearing surface 4*a* is configured to from-fittingly receive the ridge 2*a*" of the first bearing surface 2*a*.

Such a geometry of the bearing surfaces 2*a*, 4*a* helps retain the subframe laterally (i. e., horizontally) in place with respect to the frame 2 while allowing the limited vertical travel of the subframe 4. At the same time such a geometry allows transferring lateral forces between the subframe 4 and the frame 2, thus helping the subframe 4 to maintain its proper shape.

Although the embodiments illustrated in the appended drawings show the grooves 2*a*', 4*a*', and ridges 2*a*", 4*a*" of the first and second bearing surfaces 2*a*, 4*a* provided in staggered configuration, they could alternatively also be provided as a continuous curved contours, as inclined linear surfaces, or a combination of the above.

Preferably but not necessarily, the filter plate frame assembly can be configured such that, when the sub-frame 4 is the uppermost position, the seal 6 is engaged with the plate 3, and correspondingly, when the subframe 4 is in the lowermost position, the seal 6 is disengaged from the plate 3. This ensures, that pressure cannot build up in the space between the diaphragm 5 and the filter plate 3, when the filter chamber is open.

Alternatively, the filter plate frame assembly can be configured such that, when the subframe 4 is in the lowermost position, the seal bead 6 is engaged with the plate 3 so as to provide sealing against a first pressure differential, and to leak under a second pressure differential, which is higher than the first pressure differential. Moreover, the filter plate frame assembly can be configured such that, when the subframe 4 is in the uppermost position, the seal bead 6 engages with the plate 3 so as to provide sealing also against a third pressure differential, which is higher than the second pressure differential.

This allows using the first pressure differential (i.e. an underpressure in the space between the diaphragm 5 and the filter plate 5), to hold the diaphragm 5 up when the filter chamber is opened to facilitate discharge of the cake from the filter chamber, while preventing excessive inflation of the diaphragm 5 caused by an accidental pressurization exceeding the second pressure differential (i.e. an overpressure in the space between the diaphragm 5 and the filter plate 3) from damaging the diaphragm and causing a risk of injury to operating personnel. Moreover, a sufficient third pressure differential (i.e., an overpressure in the space between the diaphragm 5 and the filter plate 3) is achieved for squeezing the filter cake, when filter chamber is closed.

Such a first pressure differential is conventionally much smaller than such a third pressure differential. Typically, the first pressure differential (i.e., the underpressure between the ambient pressure and the space between the diaphragm 5 and the filter plate 3) lies between 0.01-0.10 bar, while the third pressure differential (i.e., the overpressure between ambient pressure and the space between the diaphragm 5 and the filter plate 3) is between 8-20 bar. Furthermore, the second pressure differential (i.e., the overpressure between ambient pressure and the space between the diaphragm 5 and the filter plate 3) is generally only slightly higher than the first pressure differential, typically approx. 0.15 bar.

For example, this could be achieved by providing the seal bead 6 with two seal lips, one of which is elevated higher from the diaphragm 10 than the other. In such a case, only the higher elevated seal lip may be configured to engage with the filter plate 3 when the subframe 4 is in the lowermost position, so as to provide sealing against the first pressure differential and leak under the second pressure differential. Moreover, both the higher elevated and lower elevated seal lip may be configured to engage the filter plate 3 when the subframe 4 is in the uppermost position, so as to seal against the third pressure differential.

Most suitably a seal lip elevated higher is provided on a lateral outside of the diaphragm with respect to the seal lip elevated lower. Alternatively, or additionally, the seal lip elevated higher may have a directional self-sealing geometry against an overpressure prevailing on the lateral outside, while the seal lip elevated lower may have a directional self-sealing geometry against an overpressure prevailing on the lateral inside.

In an embodiment according to the present disclosure, the limited travel of the of subframe 4 is at least. 0.5 mm. Preferably, the limited travel of the subframe is at least 1 mm.

Suitably, the limited travel of the subframe is less than 10 mm. This is because it is undesirable to increase the vertical motion of adjacent plate frame assemblies required to open the filter chamber. The total vertical movement of the associated filter press required for opening all filter chambers is the required vertical travel between two adjacent plate frame assemblies multiplied by the number of filter chambers. Moreover, increasing the required vertical travel increases the cycle time of the filtration cycle.

It should be noted that the first aspect of the present disclosure encompasses any combination of two or more embodiments, or variants thereof, as discussed above.

According to a second aspect of the present disclosure, a horizontal filter press, such as a tower press, is provided.

Particularly, the filter comprises a plurality of filter plate frame assemblies according to the first aspect of the present disclosure, as discussed above.

The filter plate frame assemblies 1 are configured movable towards each other into a closed position in which a filter chamber 4*c* is formed between adjacent filter plate frame assemblies 1, and away from each to an open position in which adjacent filter plate frame assemblies 1 are spaced apart from each other.

The filter further comprises a filter medium arranged between adjacent filter plate frame assemblies 1.

The filter further comprises a translation arrangement for moving the filter plate frame assemblies 1 towards each other so as to form a filter chamber 4*c* between adjacent filter plate frame assemblies 1, and away from each other so as to open the filter chamber.

The filter further comprises a feed arrangement for feeding slurry into the filter chamber 4*c*, a recovering arrangement for recovering filtrate from the filter chamber 4*c*, and a discharge arrangement for discharging a filter cake formed within the filter chamber 4*c*.

In an embodiment according to the second aspect of the present disclosure, the filter press further comprises diaphragm inflation means for providing a pressurized medium into the space between the diaphragm 5 and the filter plate 3 so as to inflate the diaphragm and squeeze a filter cake formed within the filter chamber 4*c*.

It should be noted that the second aspect of the present disclosure encompasses any combination of two or more embodiments, or variants thereof, as discussed above.

FIG. 1 schematically illustrates a filter plate frame assembly 1 according to an embodiment of the present disclosure, as seen as a partial cut view. Particularly, the subframe 4 is the lowermost position, corresponding to a situation in which the filter chamber 4*c* is opened. The seal bead 6 has two seal lips, the laterally outer seal lip being elevated higher from the remaining diaphragm 5 than the laterally inner seal lip. The laterally outer seal lip engages with the filter plate 3 such that a sufficient underpressure (with respect to the ambient pressure) may be exerted into the space between the diaphragm and the filter plate 3, so as to lift the diaphragm up to facilitate filter cake discharge. At the same time, the sealing provided by only the laterally outer seal lip is sufficiently weak to allow an accidental overpressure only slightly higher than the underpressure (with respect to the ambient pressure) to leak through the laterally outer seal lip. For example, the underpressure may be 0.05-0.10 bar, whereas the over pressure may be 0.15 bar or higher.

Figure 1A:
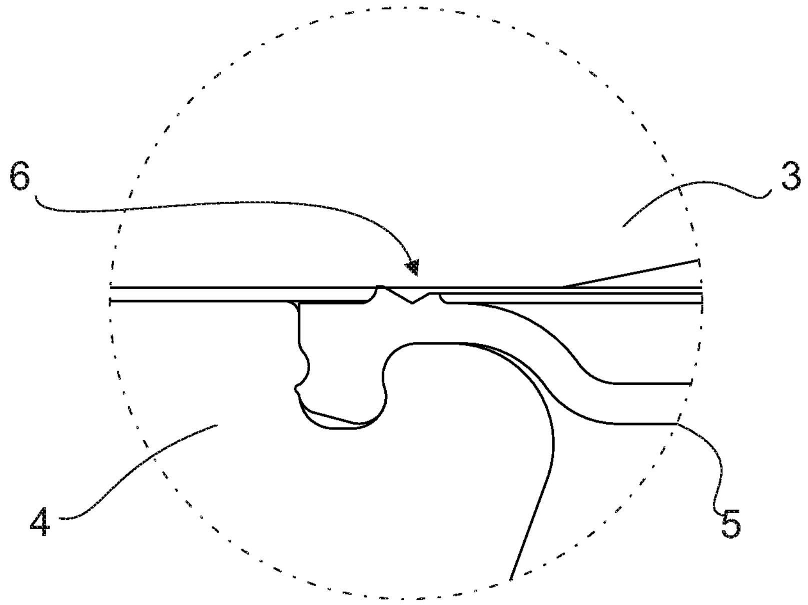

FIG. 1*a* illustrates a detailed view of the subframe 4, diaphragm 5 and filter plate 3 of FIG. 1

Figure 2:
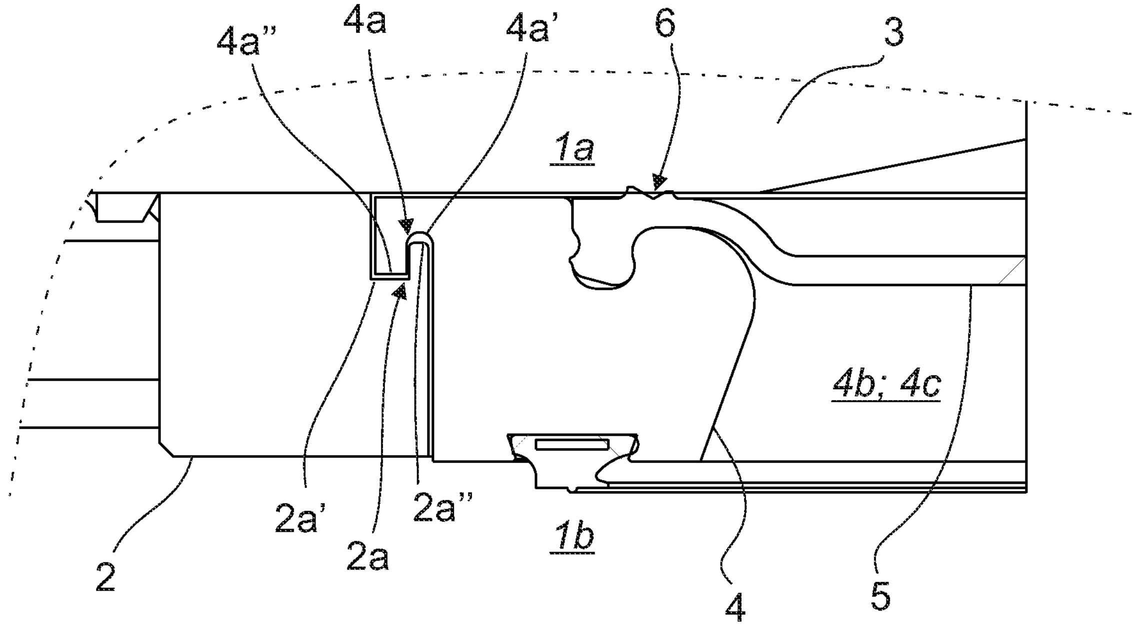
FIG. 2 illustrates the filter late frame assembly of FIG. 1, where the subframe is in the uppermost position.

FIG. 2 illustrates the filter plate frame assembly 1 of FIG. 1, where the subframe 4 is in the uppermost position, corresponding to a situation in which the filter chamber 4*c* is closed.

Figure 2A:
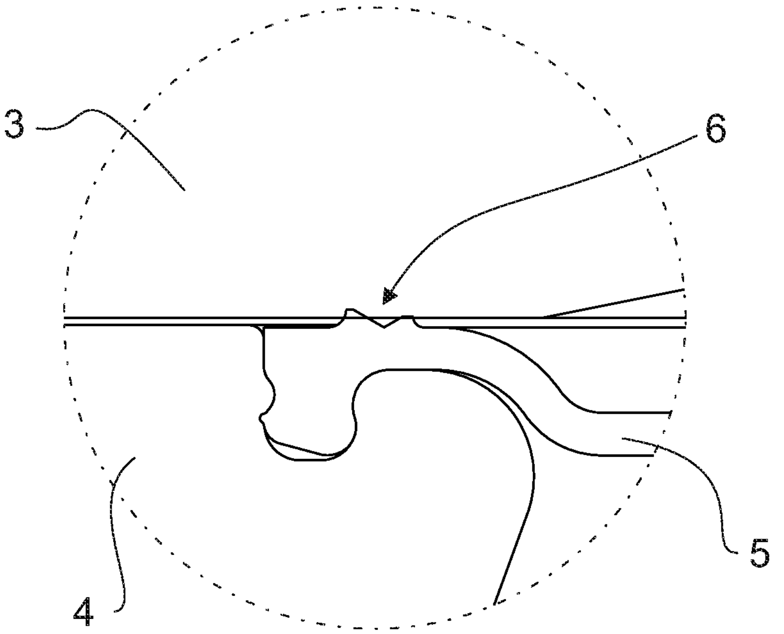
FIG. 2*a* illustrates a detailed view of the subframe, diaphragm and filter plate of FIG. 2

In the uppermost position of the subframe 4, both the laterally outer and laterally inner seal lip are engaged with the filter plate 3. This allows a sufficiently high over pressure (with respect to the ambient pressure) of typically between 8-20 bar to be formed in the space between the diaphragm 5 and the filter plate 3, so as to inflate the diaphragm into the filter chamber 4*c* during filtration, and squeeze residual liquid contents out of the filter cake. and FIG. 2*a* illustrates a detailed view of the subframe, diaphragm and filter plate of FIG. 2

LIST OF REFERENCE NUMERALS

1 filter plate frame assembly
1*a* plate side
2 filter plate frame
2*a* first bearing surface of plate frame
2*a*' groove of first bearing surface
2*a* ridge of first bearing surface
3 filter plate
4 subframe
4*a* second bearing surface of subframe
4*a*' groove of second bearing surface
4*a*" ridge of second bearing surface
4*b* central opening of subframe
4*c* filter chamber formed in central opening
5 diaphragm
6 seal bead

The invention claimed is:

1. A filter plate frame assembly for a horizontal filter press, including at least one horizontally extending filter chamber, comprising:

a filter plate frame defining a closed periphery, wherein the filter plate frame comprises a first bearing surface;

a filter plate attached onto the filter plate frame on a plate side of the filter plate frame assembly, and covering at least an area delimited by the filter plate frame;

a subframe with a central opening having a second bearing surface and a closed area defining a lateral boundary of an associated filter chamber, when in use, and wherein the subframe is nested within and laterally delimited by the closed periphery of the filter plate frame; and a diaphragm attached to the subframe and having a continuous seal bead for sealing the diaphragm against the filter plate, such that a space delimited by the continuous seal bead is defined between the diaphragm and the filter plate, wherein the subframe is vertically positioned between the filter plate frame and the filter plate, wherein the subframe is sized and configured such that a vertical free play is created between the filter plate and the filter plate frame that allows a limited vertical travel of the subframe with respect to the filter plate frame and the filter plate, wherein the subframe has an uppermost position within the limited vertical travel corresponding to a situation in which the subframe is pressed towards the filter plate, and a lowermost position within the limited vertical travel corresponding to a situation in which the subframe is not pressed towards the filter plate, wherein, in the lowermost position, the subframe is vertically supported by the first bearing surface at the second bearing surface, and wherein, in the uppermost position, the subframe is not vertically supported by the by the first bearing surface, wherein the first bearing surface comprises a groove and a ridge and the second bearing surface comprises a groove and ridge, wherein the groove of the first bearing surface is configured to form fittingly receive the ridge of the second bearing surface and the groove of the second bearing surface is configured to from-fittingly receive the ridge of the first bearing surface, and wherein the diaphragm and the continuous seal bead are movable with the subframe, reside between the subframe and the filter plate and the diaphragm covers an area delimited by the subframe.

2. The filter plate frame assembly according to claim 1, wherein when the subframe is in the uppermost position, the seal bead is engaged with the filter plate, and when the subframe is in the lowermost position, the continuous seal bead is disengaged from the filter plate.

3. The filter plate frame assembly according to claim 1, wherein when the subframe is in the lowermost position, the continuous seal bead is engaged with the filter plate so as to provide sealing against a first pressure differential, and to leak under a second, higher pressure differential, when the subframe is in the uppermost position, the continuous seal bead engages with the filter plate so as to provide sealing also against the second pressure differential.

4. The filter plate frame assembly according to claim 1, wherein the limited travel of the of subframe is at least 0.5 mm.

5. A horizontal filter press, wherein the horizontal filter press comprises:

a plurality of filter plate frame assemblies according to claim 1, wherein the filter plate frame assemblies are configured movable towards each other into a closed position in which a filter chamber is formed between adjacent filter plate frame assemblies, and away from each to an open position in which adjacent filter plate frame assemblies are spaced apart from each other;

a filter medium arranged between adjacent filter plate frame assemblies;

a translation arrangement for moving the filter plate frame assemblies towards each other so as to form a horizontally extending filter chamber between adjacent filter plate frame assemblies, and away from each other so as to open the filter chamber;

a feed arrangement for feeding slurry into the filter chamber;

a recovering arrangement for recovering filtrate from the filter chamber, and a discharge arrangement for discharging a filter cake formed within the filter chamber.

6. The horizontal filter press according to claim 5, wherein the filter press further comprises diaphragm inflation means for providing a pressurized medium into the space between the diaphragm and the filter plate so as to inflate the diaphragm and squeeze a filter cake formed within the filter chamber.

* * * * *